United States Patent Office 3,347,875
Patented Oct. 17, 1967

3,347,875
ACETYLENIC EPOXIDES AND DIENES
Donald J. Foster, South Charleston, and Denvil E. Reed, Jr., Charleston, W. Va., assignors to Union Carbide Corporation, a corporation of New York
No Drawing. Filed Feb. 19, 1965, Ser. No. 434,120
11 Claims. (Cl. 260—348)

The instant invention is directed to the production of novel acetylenic compounds. In one aspect this invention provides a novel process for the production of cyclic compounds employing vinylacetylene. In another aspect this invention is directed to novel cyclic compounds produced thereby. In a still further aspect this invention is directed to novel reactive epoxide monomers containing acetylenic groups.

The addition reaction of vinylacetylene has heretofore been noted in autopolymerizations with itself to yield linear polymers, or polymers containing four-membered rings. It has now been found that vinylacetylene will participate in addition reactions with dienic compounds to yield novel cyclic compounds which contain both ethylenic and acetylenic unsaturation. It has also been found that the ethylenic bond of these said novel addition products can be epoxidized to produce novel monoepoxy and diepoxy monomers.

The novel process of this invention comprises reacting vinylacetylene and a conjugated diene in an organic solvent medium at a temperature of from about 50° to about 250° C. The novel process of this invention may be illustrated by the following exemplary reaction between butadiene and vinylacetylene to produce 3-cyclohexenylacetylene.

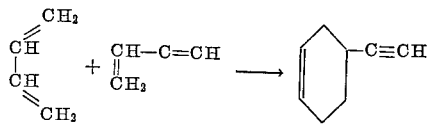

A broad spectrum of diene compounds may be employed with vinylacetylene in accordance with the novel process of this invention. The dienic compounds are identified by the conjugated double bonds, structure, i.e.,

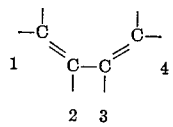

the said structure being part of an aliphatic chain or a homocarbocyclic or heterocyclic ring. The dienic structure can be variously substituted with hydrocarbon or substituted hydrocarbon groups without effecting the basic reactivity of the dienic structure in the reaction with vinylacetylene.

With acyclic dienes, reactivity appears to depend to a greater extent upon the position of the substituents on the acyclic chain rather than the size of the substituent groups. The existence of alkyl, alkoxy, or aryl groups on the inner two carbon atoms of the conjugated structure, e.g., the 2 and 3 positions on butadiene, generally enhance the reactivity of the diene, whereas substitution of these groups in the terminal carbon atoms, e.g., the 1 and 4 positions in butadiene, decrease reactivity. Accordingly, it may be expected that 2,3-dimethylbutadiene will be more reactive than butadiene which in turn will be more reactive than 2,4-hexadiene. This applied equally to aromatic substituents such as in 2,3-diphenylbutadiene.

Cyclic dienes having 5 and 6 membered carbon rings are extremely reactive and the reactivity does not decrease appreciably with increased substitution of the ring. The dienes useful in this invention include cyclic and acyclic dienes having the aforedescribed characteristic structure as part of the aliphatic chain or as part of a homocarbocyclic or heterocyclic ring. These compounds may be hydrocarbons, for example straight chain aliphatic dienes, halohydrocarbons, ethers, esters, carboxylic acids, alcohols, aldehydes, ketones, amines, or thiols. Highly preferred are those compounds having the aforesaid dienic structure, wherein the inner carbon atoms in the dienic portion (i.e., those designated 2 and 3 above) are free from substitution other than by hydrogen, halogen, hydrocarbon, or halohydrocarbon moieties, and wherein the terminal carbon atoms in the dienic portion (i.e., those designated 1 and 4 above) are substituted with either hydrogen, hydroxyl, halogen, carboxyl, amino, mercapto, and the like.

Accordingly, the preferred dienes which may be used in the novel process of this invention may be conveniently described by the structural formulae:

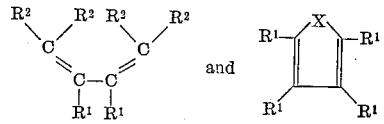

wherein $R^1$ represents hydrogen, halogen, or a monovalent hydrocarbon radical free from substitution other than halogen substitution, preferably alkyl or haloalkyl groups, $R^2$ represents hydrogen, halogen, or a monovalent hydrocarbon group free from substitution other than halogen, or oxygen in the form of hydroxyl groups, carboxyl groups in carboxylic acids or esters, ether linkages, or carbonyl group as in ketones and aldehydes and nitrogen in the form of amino groups. Preferably the substituted and unsubstituted hydrocarbon moieties are free from unsaturation other than benzenoid unsaturation, e.g., alkyl or substituted alkyl of up to 12 carbon atoms, aryl or substituted aryl of 6 to 12 carbon atoms, or cycloalkyl or substituted cycloalkyl of 5 to 12 carbon atoms; and wherein X is —$CH_2$—, —$CH_2$—$CH_2$—, —S—, or

where R is hydrogen or alkyl of from 1 to 4 carbon atoms. The dienes preferably contain a total of 4 to 18 carbon atoms, and highly preferably 4 to 12 carbon atoms. Highly preferably $R^1$ and $R^2$ are hydrogen or alkyl groups of up to 6 carbon atoms.

Illustrative of the dienes useful in the instant invention are butadiene, isoprene, chloroprene, 2,3-dimethylbutadiene, 2,3 - diphenylbutadiene, 1-cyclohexylbutadiene, sorbic acid, 2-methyl sorbic acid, phenyl sorbate, 1-propoxybutadiene, 1-hydroxybutadiene, 1,4 - dichlorobutadiene, 2,4-pentadiene, 2,4-pentadien-1-ol, 2,4-pentadienoic acid, 1-cyclohexylmethyl-1,3-pentadiene, 5-amino-1,3-pentadiene, 5-(N-methylamino-1,3-pentadiene, 1-butoxypenta-2,4-diene, 1,3-hexadienal, 2,4-hexadiene, 2,4-diphenylhexadiene, 2-methyl-6-phenyl-1,3-hexadiene, 1,1-dibromohexadiene, 1-chlorophenyl-2,3-hexadiene, 1-iodo-2,4-heptadiene, 1,3-heptadiene, 5 - chloro-2,4-heptadiendioic acid, diethyl 2,4-heptadiendioate, 1,7-diethoxy-2,4-heptadiene, 1,2,4,5-tetramethyl-3,5-heptadiene, 2,4 - octadiene, 3,5-octadiene, 2,4,6-octatriene, 1 - phenyl - 2,4,6-octatriene, 1,1-dichloro - 2,4 - octadiene, 2,4,6-octatriene-1,8-dioic acid, 6,8-dodecadiene, 2,4,8 - dodecatriene, 2,4-dodecadienoic acid, 6,8,10 - octadecatriene, cyclopentadiene, 1,2-dichloro-3,5-cyclopentadiene, bromocyclopentadiene, 1 - phenyl - 3,5 - cyclopentadiene, bis(cyclopentadienyl) ether, 1-propoxy-3,5-cyclopentadiene, pyrrole, N-ethylpyrrole, N - phenylpyrrole, 2,3 - dimethylpyrrole, furan, 1,4-diethylfuran, thiophene, 2-butoxythiophene, 4-hexylthiophene, cyclohexadiene, 1,1 - dichloro-2,4-cyclohexadiene, 1-methoxy-2,4-cyclohexadiene, dicyclopentadiene, bicyclohexenyl, methylbicyclohexenyl and the like.

Of course when an acyclic diene is employed in the novel process of this invention there are obtained compounds having a six membered carbon ring of the structure

I.

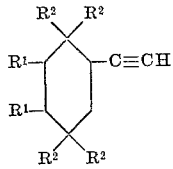

wherein $R^1$ and $R^2$ are as hereinbefore designated.

When a homocarbocyclic or heterocyclic diene is employed in the process of this invention there is formed within one aspect of this invention a new class of compounds which are identified also by a polycyclic ring and which correspond to the formula:

II.

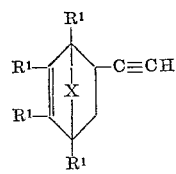

where X has the same meaning as above, and wherein each $R^1$ is independently selected from the radicals as hereinbefore designated. Accordingly, there are provided novel bicycloheptyl acetylene compounds containing a bicyclo[2.2.1]heptanoid structure or a bicyclo[2.2.2]octanoid structure.

Illustrative of the novel compounds are 5-ethynylbicyclo[2.2.1]hept-2-ene and the halo, hydrocarbon, and halohydrocarbon derivatives thereof including 1-methyl-5-ethynylbicyclo[2.2.1]hept-2-ene,
7,7-dimethyl-5-ethynylbicyclo[2.2.1]hept-2-ene,
4-chloroethyl-5-ethynylbicyclo[2.2.1]hept-2-ene,
1-phenyl-5-ethynylbicyclo[2.2.1]hept-2-ene,
7-(p-chlorophenyl)-5-ethynylbicyclo[2.2.1]hept-2-ene,
1,4-diphenyl-5-ethynylbicyclo[2.2.1]hept-2-ene,
1-bromobutyl-5-ethynylbicyclo[2.2.1]hept-2-ene,
7,7-dichloro-5-ethynylbicyclo[2.2.1]hept-2-ene,
1,2,3,4-tetraethyl-5-ethynylbicyclo[2.2.1]hept-2-ene, and the like, as well as 7-hetero-5-ethynylbicyclo[2.2.1]-hept-2-enes such as 7-oxa-5-ethynylbicyclo[2.2.1]hept-2-ene and 7-aza-5-ethynylbicyclo[2.2.1]hept-2-enes, 7-thia-5-ethynylbicyclo[2.2.1]hept-2-enes and the halogen, hydrocarbon and halohydrocarbon-substituted derivatives thereof such as:

1-methyl-7-oxa-5-ethynylbicyclo[2.2.1]hept-2-ene,
4-chloro-7-aza-5-ethynylbicyclo[2.2.1]hept-2-ene,
1-phenyl-7-thia-5-ethynylbicyclo[2.2.1]hept-2-ene,
1-chlorophenyl-7-aza-5-ethynylbicyclo[2.2.1]hept-2-ene,
1,4-diphenyl-7-oxa-5-ethynylbicyclo[2.2.1]hept-2-ene,
1-bromobutyl-7-thia-5-ethynylbicyclo[2.2.1]hept-2-ene,
4-cyclohexyl-7-oxa-5-ethynylbicyclo[2.2.1]hept-2-ene,
1,2,4-trimethyl-7-azo-ethynylbicyclo[2.2.1]hept-2-ene,
N-methyl-7-aza-5-ethynylbicyclo[2.2.1]hept-2-ene,
N-chloroethyl-7-aza-5-ethynylbicyclo[2.2.1]hept-2-ene, and the like. Other novel compounds include those having a characteristic bicyclo[2.2.2]octenyl structure such as 5-ethynylbicyclo[2.2.2]oct-2-ene and the halogen, hydrocarbon, halohydrocarbon substituted derivatives thereof such as 1,4-dimethyl-5-ethynylbicyclo[2.2.2]oct-2-ene,
7,8-dimethyl-5-ethynylbicyclo[2.2.2]oct-2-ene,
7-chloro-5-ethynylbicyclo[2.2.2]oct-2-ene,
4-phenyl-5-ethynylbicyclo[2.2.2]oct-2-ene,
2-bromobutyl-5-ethynylbicyclo[2.2.2]oct-2-ene,
4-cyclohexylmethyl-5-ethynylbicyclo[2.2.2]oct-2-ene, and the like.

In accordance with another aspect of this invention there is provided novel dimers of the above novel compounds described in Formulae I and II above. The novel dimers according to this invention are formed through the hydrogen atom of the ethynyl group and correspond to the formulae

III

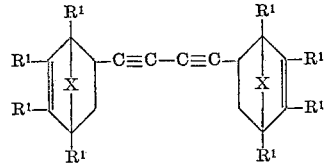

and

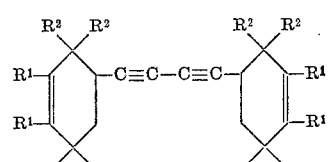

wherein X and $R^1$ are as hereinbefore designated. For example 5-ethynylbicyclo[2.2.1]hept-2-ene will result in bis(5 - bicyclo[2.2.1]hept-2-en-5-yl)buta-1,3-diyne, illustrative of the other novel dimers include Bis(3-cyclohexenyl)buta-1,3-diyne,
Bis(1,4-dimethylbicyclo[2.2.1]hept-2-en-5-yl)buta-1,3-diyne,
Bis(4-chloroethylbicyclo[2.2.1]hept-2-en-5-yl)buta-1,3-diyne,
Bis(2-chloroethylcyclohex-3-enyl)buta-1,3-diyne,
Bis(4-phenylbicyclo[2.2.1]hept-2-en-5-yl)buta-1,3-diyne,
Bis(2,2-dimethylcyclohex-3-enyl)buta-1,3-diyne,
Bis(4-bromobutyl-7-oxabicyclo[2.2.1]hept-2-en-5-yl)buta-1,3-diyne,
Bis(5-phenylcyclohex-3-enyl)butadiyne,
Bis(7,7-dichlorobicyclo[2.2.1]hept-2-en-5-yl)buta-1,3-diyne,
Bis(2-methyl-4-ethylcyclohex-3-enyl)buta-1,3-diyne,
Bis(1,4-diphenyl-7-azabicyclo[2.2.1]hept-2-en-5-yl)buta-1,3-diyne,
Bis(3,4-dimethylcyclohex-3-enyl)buta-1,3-diyne,
Bis(1-chloro-N-methyl-7-azabicyclo[2.2.1]hept-2-en-5-yl)buta-1,3-diyne,
Bis(1,4-dichloroethyl-7-thiabicyclo[2.2.1]hept-2-en-5-yl)buta-1,3-diyne,
Bis(1-hexylbicyclo[2.2.2]oct-2-en-5-yl)buta-1,3-diyne,
Bis(1-chlorocyclopentylbicyclo[2.2.2]oct-2-en-5-yl)buta-1,3-diyne, and the like.

And in a still further aspect there are provided by this invention novel and useful epoxide compounds obtainable by epoxidizing the aforesaid compounds described in Formulae II, III and IV to obtain novel monoepoxides of the formula:

V

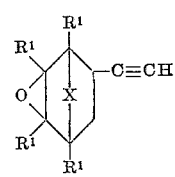

and novel polyepoxides of the formulae:

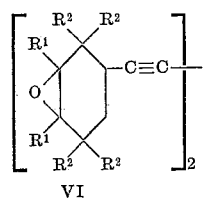 and 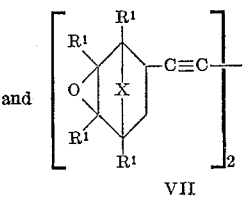

VI                    VII wherein X, $R^1$ and $R^2$ are as hereinbefore designated.

Illustrative of the novel epoxides of this invention which may be produced in accordance with this embodiment of the invention are:

1,5-dimethyl-6-ethynyl-3-oxatricyclo[3.2.1.0$^{2,4}$]octane,
5-chloro-6-ethynyl-3-oxatricyclo[3.2.1.0$^{2,4}$]octane,
5-phenyl-6-ethynyl-3-oxatricyclo[3.2.1.0$^{2,4}$]octane,
1-chloroethyl-6-ethynyl-3,8-dioxatricyclo[3.2.1.0$^{2,4}$]octane,
3-propyl-6-ethynyl-3-oxa-8-azatricyclo[3.2.1.0$^{2,4}$]octane,
1-bromoethyl-6-ethynyl-3-oxa-9-thiatricyclo[3.2.1.0$^{2,4}$]octane,
5-chlorophenyl-6-ethynyl-3-oxatricyclo[3.2.2.0$^{2,4}$]octane,
4-chlorophenyl-6-ethynyl-3-oxatricyclo[3.2.2.0$^{2,4}$]octane, as well as the polyepoxides;
Bis(3,4-epoxycyclohexyl)buta-1,3-diyne,
Bis(3-oxatricyclo[3.2.1.0$^{2,4}$]oct-6-yl)buta-1,3-diyne,
Bis(2,2-dimethyl-3,4-epoxycyclohexyl)buta-1,3-diyne,
Bis(1-phenyl-3-oxatricyclo[3.2.1.0$^{2,4}$]oct-6-yl)buta-1,3-diyne,
Bis(5-phenyl-3,4-epoxycyclohexyl)buta-1,3-diyne,
Bis(1-chlorophenyl-3-oxatricyclo[3.2.1.0$^{2,4}$]oct-6-yl)buta-1,3-diyne,
Bis(3-methyl-3,4-epoxycyclohexyl)buta-3-diyne,
Bis(1,5-dimethyl-3,8-dioxatricyclo[3.2.1.0$^{2,4}$]oct-6-yl)buta-1,3-diyne,
Bis(2-chloroethyl-3,4-epoxycyclohexyl)buta-1,3-diyne,
Bis(5-bromo-3-oxa-8-thiatricyclo[3.2.1.0$^{2,4}$]oct-6-yl)buta-1,3-diyne,
Bis(3-oxa-8-azatricyclo[3.2.1.0$^{2,4}$]oct-6-yl)buta-1,3-diyne, and the like.

The aforesaid novel ethynyl substituted addition compounds according to the structure in Formulae I and II above, may be produced in accordance with the novel process of this invention by reacting vinylacetylene and a diene as described above at a temperature or from about 50° to about 250° C. At temperatures in the lower portion of this range the reaction proceeds slowly, whereas at the upper temperatures, the rate of polymerization of vinyl acetylene can become significant. Accordingly, it is preferred to conduct the reaction at a temperature of from about 120° to about 200° C.

The reaction is conveniently conducted in an inert liquid organic solvent medium. In addition to the convenience of conducting the reaction in this manner, the solvent aids in limiting autopolymerization and linear copolymerization of the reactants.

Suitable solvents include hydrocarbons such as hexane, heptane, hexene, methylcyclohexane, benzene, toluene, xylene, alcohols such as methanol, ethanol, isopropanol, ethylene glycol, propylene glycol, glycol ethers such as methoxyethanol, and ethers such as ethyl ether, methyl ethyl ether, isopropyl ether and the like.

Pressure is wholly non-critical and the process may be conducted at subatmospheric, atmospheric or superatmospheric conditions. No advantage results from using reduced pressures. Although the reaction may be satisfactorily conducted in open systems, it is preferred to operate at the superatmospheric autogenous pressure of a closed system, thus enabling regulation of the temperature to the upper portion of the prescribed range so as to hasten the reaction.

Reaction time is an inverse function of temperature, and will vary depending on the reactants, the concentration, and the like. Completion of the reaction may be easily determined by analysis of product. At a reaction temperature of 100° C. the reaction time would be of the order of 2 hours.

The vinylacetylene employed in the novel process of this invention need not be in the pure state. The process may be very effectively carried out using for example, a gas stream which comprises a "butadiene residue" which results from processes for the manufacture of butadienes. Such a butadiene residue contains a significant portion of butenes in addition to vinylacetylene and small amounts of other by-products. However, the presence of such other hydrocarbons in the reaction mixture of the diene and vinylacetylene does not obstruct the novel process, and in fact advantageously act as a diluent and carrier for the vinyl acetylene.

The novel process will generally produce equal amounts of the stereo isomers of the addition products, for example, the reaction of cyclopentadiene with vinylacetylene will yield 2-ethynylbicyclo[2.2.1]hept-2-ene in both the exo and endo form:

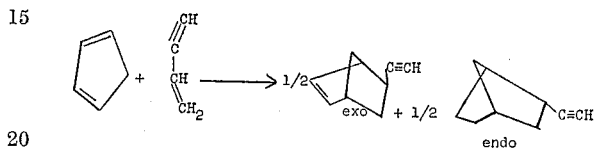

The exo and endo isomers may be satisfactorily separated by conventional laboratory techniques. Vapor chromatographic techniques are useful to obtain the isomers in high degrees of purity.

These ethynyl substituted cycloalkenes are dimerized to the novel compounds of the structures designated by Formulas III and IV by contacting the ethynyl addition product with oxygen in the presence of a cuprous chloride catalyst. The dimerization reaction may be illustrated by the following dimerization of 5-ethynylbicyclo[2.2.1]hept-2-ene.

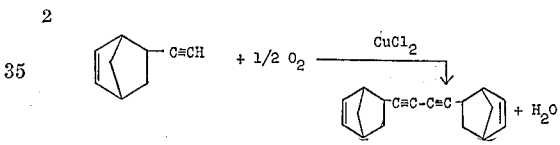

The dimerization reaction may be conducted at room temperature, however, the reaction is exothermic and it is not necessary to attempt to maintain temperature at the ambient level throughout the reaction. The reaction is preferably conducted under pressure preferably of from about 10 to about 200 p.s.i. preferably from about 30 to about 150 p.s.i. The reaction speed increases with pressure.

Dimerizations employing pure oxygen under pressure in the reaction proceed at a fairly rapid rate. However, air may be used, in which case the reaction will proceed more slowly. To speed reaction the pressures can be raised where process conditions permit.

The cuprous chloride catalyst is employed in small catalytic amounts. Generally from about 0.5 to about 5.0 percent by weight of the catalyst is sufficient. The catalyst is not affected by the reaction and may be reused in subsequent dimerizations. The dimerization process is suitably conducted in a continuous manner using a tubular reaction containing the catalyst by continuously charging the ethynyl-substituted addition product under pressure with oxygen or air, and continuously removing the novel dimers at the opposite end of the reactor.

The novel mono- and polyepoxides of Formulae V, VI and VII may be prepared by epoxidation of the corresponding olefinic precursor with a suitable epoxidizing agent. The dimer epoxides of Formulae VI and VII may be alternatively prepared by initially preparing the dimer (Formulae III and IV) and proceeding with the epoxidation, or by first epoxidizing the simple ethynyl cycloalkenyl addition product (Formulae I and II), and subsequently carrying out the dimerization in the presence of oxygen and cuprous chloride as described above.

Epoxidation of the olefinic precursors of the mono- and polyepoxides is most easily effected by means of an organic peracid. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to about 50 weight percent of peracid based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably from about 25° C. to about 75° C. It is highly desirable to employ an excess of the stoichiometric quantity of peracid (per carbon to carbon double bond of the olefinic or polyolefinic precursor) in order to effect or favor substantial diepoxidation of said precursor. For instance, from about 2.2 to about 10, and higher, mols of peracid per mol of the precursors of Formulae I and II can be employed with advantageous results, though lower and higher ratios of peracid to precursor can be used, if desired. The epoxidation reaction is conducted for a period of time sufficient to introduce oxirane oxygen at the site of the carbon to carbon double bonds present in the polyolefinic precursor, e.g., from several minutes to several hours. Periodic analysis of samples of the reaction mixture to determine the quantity of peracid consumed during the epoxidation reaction can be readily performed by the operator by well-known techniques. At the termination of the epoxidation reaction, the unreacted olefinic precursor, acid by-product, unspent peracid, inert vehicle, if employed, and the like can be recovered from the reaction product mixture, for example, by distillation under reduced pressure. Further well-known purification techniques can be employed, as desired.

The novel epoxides of this invention may be polymerized to give useful polymers ranging from viscous liquids to hard infusible resins. The polymerization may be effected with Lewis acid catalysts such as boron trifluoride, stannic chloride or the like.

In another aspect of the novel ethynyl substituted cycloalkenyl addition products of Formula I may be reacted with phenol to form useful trisphenols which may be advantageously employed in rigid polyurethane foams using techniques well known in the art.

The following examples are illustrative.

Example I

To a dry heat resistant glass tube, cooled in a Dry Ice-acetone bath while being purged with nitrogen were placed 15 milliliters of n-heptane, 7 grams of cyclopentadiene (0.1 mole), 8 grams of vinylacetylene (0.15 mole), and a trace of pyrogallol. The tube was sealed and rocked at 160° C. for 4.5 hours, and allowed to cool at room temperature, then further cooled in a Dry Ice-acetone bath. The product was separated using vapor chromatographic methods. There were obtained 6.5 grams of the exo isomer of 5-ethynylbicyclo[2.2.1]hept-2-ene in a purity of 98.4 percent, and 5.3 grams of the corresponding endo isomer in a purity of 99.9 percent. The isomers exhibited the following properties:

| | Exo | Endo |
| --- | --- | --- |
| Boiling Point, ° C | 144 | 149 |
| Refractive Index, $n_D^{20}$ | 1.4904 | 1.4941 |

Example II

The procedure of Example I was repeated maintaining the tube at 80° C. The yields of the exo and endo isomers of 5-ethynyltricyclo[3.2.1]hept-2-ene were respectively 3.5 and 3.0 grams.

Example III

The procedure of Example I was repeated maintaining the tube at 120° C. The yields of the exo and endo isomers of 5-ethynylbicyclo[3.2.1]-hept-2-ene were respectively 4.5 and 3.8 grams.

Example IV

The procedure of Example I was repeated using as the reactants 20 grams of a butadiene residue containing 30 percent vinylacetylene (6 grams, 0.1 mole), 25 percent butadiene (5 grams, 0.1 mole) and 0.1 gram of pyrogallol, and adding thereto 20 milliliters of n-heptane. The product constituted 2.5 grams of a compound identified as 3-cyclohexenylacetylene.

Example V

To 150 milliliters of dry ethanol in a 500 milliliter flask equipped with a stirrer and a brine-cooled reflux condenser was added 26 grams of vinylacetylene, 33 grams of cyclopentadiene, 1 gram of pyrogallol. The mixture was stirred at 37° C. for 3.5 hours. Two volumes of water were added to the product and the organic layer was decanted. The water layer was extracted twice with n-pentane and the extracts were combined with the organic layer. The organic layer was distilled yielding about one gram of the mixed isomers of 5-ethynylbicyclo[2.2.1]hept-2-ene which were so identified by infrared analysis.

Example VI

To a one liter steel bomb were added 500 grams of anhydrous isopropanol, 230 grams (3.5 moles) of cyclopetadiene, 694 g. of "butadiene residue" containing 30 percent (4 moles) of vinylacetylene, and 1 gram pyrogallol. The bomb was heated to 120° and agitated for 4 hours during which the pressure rose to 100 p.s.i.g. The product was extracted 3 times with 150 ml. of water and the residue was distilled at reduced pressure. The yield of mixed exo and endo isomers of 2-ethynylbicyclo-[2.2.1]hept-5-ene was 125 grams, so identified by infrared analysis.

Example VII

To a one liter steel bomb were added 500 ml. of triethylbenzene, 200 g. of "butadiene residue" containing 30 percent of vinylacetylene, 216 g. of butadiene, and 2 g. of pyrogallol. The bomb was heated to 150° C. and agitated for 12 hours during which the pressure rose to 300 p.s.i.g. The product was purified by reaction with 5 percent silver nitrate solution; the precipitate was filtered, washed with methanol, acidified with dilute hydrochloric acid, and steam distilled. The yield of 3-cyclohexenylacetylene was 36 grams. The product was identified by infrared analysis.

Example VIII

To a one liter steel bomb were added 500 g. of triethylbenzene, 200 g. of "butadiene residue" containing 30 per cent of vinylacetylene, 200 g. of dicyclopentadiene, and 0.5 g. of cobaltocene. The bomb was heated to 190° C. and agitated for 6 hours during which the pressure rose to 220 p.s.i.g. Distillation of the product gave 125 g. of mixed exo and endo isomers of 2-ethynylbicyclo[2.2.1]hept-5-ene, identified by infrared analysis.

Example IX

To a solution of 0.33 gram of mercuric chloride (1.22 millimoles) in 4 milliliters of water was added a solution of 0.82 gram (2.47 millimoles) of potassium iodide in two milliliters of water. The red precipitate which formed dissolved upon stirring, and one milliliter of 10 percent aqueous potassium hydroxide was added. The clear solution was stirred while dropwise addition was made of 0.24 gram (1 mmole) of 2-ethynylexobicyclo[2.2.1]hept-5-ene in 10 milliliters of methanol. After 15 minutes the precipitate of the mercury derivative was filtered off, washed with cold methanol, and recrystallized twice from ethanol, melting point, 159–159.5° C. The corresponding endo-isomer, prepared in the same manner, melted at 162–162.5° C.

*Example X*

To a pressure bottle containing two grams of cuprous chloride and 100 milliliters of dry pyridine was added 2 grams of 2-ethynylexobicyclo[2.2.1]hept-5-ene. The vessel was sealed, pressurized with oxygen to 50 p.s.i.g. and agitated for two hours. A 0.5 pound pressure drop was observed. The reaction mixture was neutralized with concentrated hydrochloric acid and extracted with ethyl ether. The ether extract was washed with water, dried with anhydrous magnesium sulfate, and evaporated to dryness in a dish. The residue (1.5 grams) was recrystallized from methanol, melting point 74.5–75.5° C. and was identified as bis(exobicyclo[2.2.1]hept - 2 - en-5-yl) buta-1,3-diyne by infrared analysis. The corresponding endo isomer also identified by infrared analysis demonstrated a melting point of 58 to 59° C.

*Example XI*

To a solution of 3.3 grams of mixed isomers of 1,4-bis(bicyclo[2.2.1]hept - 2 - ene-5-yl)buta-1,3-diyne in 10 milliliters of ethyl acetate in a 50 milliliter round-bottom flask fitted with a stirrer, dropping funnel, reflux condenser, and thermometer was added, dropwise and with stirring, 10.2 grams of a 22 percent solution of peracetic acid in ethylbenzene. The addition was made at 30° C., following which the temperature was maintained at 50° C. for two hours. Water was added to the reaction mixture and the precipitate was extracted with ethyl ether. The ether solution was dried with anhydrous magnesium sulfate and evaporated in a dish. The residue was crystallized from methanol, melting point 116–125° C. The residue compound was identified as bis(3-oxatricyclo [3.2.1.0²,⁴]oct-6-yl)buta-1,3-diyne (mixture of isomers) by infrared analysis.

What is claimed is:

1. An epoxide of the formula:

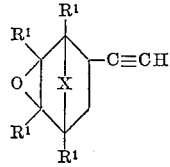

wherein X is a bivalent radical selected from the group consisting of —CH₂—, —CH₂CH₂—, —O—, —S—, and

wherein R is selected from the group consisting of hydrogen and alkyl radicals of from 1 to 4 carbon atoms; and wherein each R¹ individually is selected from the group consisting of hydrogen and alkyl groups of up to 6 carbon atoms.

2. The epoxide of claim 1 wherein X is a methylene group.
3. The epoxide of claim 2 wherein each R¹ is hydrogen.
4. A diene of the formula:

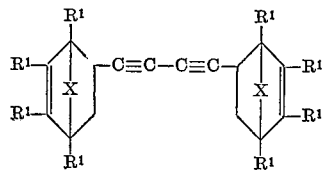

wherein X is a bivalent radical selected from the group consisting of —CH₂—, —CH₂CH₂—, —O—, —S—, and

wherein R is selected from the group consisting of hydrogen and alkyl radicals of from 1 to 4 carbon atoms; and wherein each R¹ individually is selected from the group consisting of hydrogen and alkyl groups of up to 6 carbon atoms.

5. The diene of claim 4 wherein each X represents a methylene group.
6. The compound of claim 5 wherein each R¹ is hydrogen.
7. A novel diepoxide of the formula:

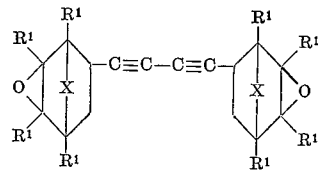

wherein X is a bivalent radical selected from the group consisting of —CH₂—, —CH₂CH₂—, —O—, —S—, and

wherein R is selected from the group consisting of hydrogen and alkyl radicals of from 1 to 4 carbon atoms; and wherein each R¹ individually is selected from the group consisting of hydrogen and alkyl groups of up to 6 carbon atoms.

8. The diepoxide of claim 7 wherein each X represents a methylene group.
9. The diepoxide of claim 8 wherein each R¹ is hydrogen.
10. A diepoxide of the formula:

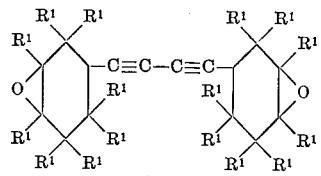

wherein R¹ is a radical selected from the group consisting of hydrogen and alkyl groups containing up to 6 carbon atoms.

11. The diepoxide of claim 10 wherein R¹ is hydrogen.

References Cited

UNITED STATES PATENTS

| | | | |
|---|---|---|---|
| 2,349,232 | 5/1944 | Joshel | 260—666 |
| 2,401,414 | 6/1946 | Doumani et al. | 260—666 |
| 3,144,491 | 8/1964 | O'Connor et al. | 260—666 |
| 3,183,249 | 5/1965 | Wiese | 260—348 |

FOREIGN PATENTS

| | | |
|---|---|---|
| 796,133 | 6/1958 | Great Britain. |

OTHER REFERENCES

Bohlmann et al.: Chem. Ber., vol. 97, March 1964, pp. 794–800.

Nazarov et al.: Chem. Abstracts, 1948, vol. 42, p. 7728e.

Klebanski et al.: Chem. Zentralblatt, 1935, II, p. 3845.

ALEX MAZEL, *Primary Examiner.*

NICHOLAS S. RIZZO, *Examiner.*

M. O'BRIEN, J. A. NARCAVAGE, *Assistant Examiners.*